United States Patent
Wibbels et al.

(10) Patent No.: US 6,606,470 B1
(45) Date of Patent: *Aug. 12, 2003

(54) COLOR PLANE PARTIAL EXPOSURE FOR REDUCING EDGE EFFECT

(75) Inventors: Mark Wibbels, Boise, ID (US); Victor Loewen, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 25 days.

This patent is subject to a terminal disclaimer.

(21) Appl. No.: 09/676,282

(22) Filed: Sep. 28, 2000

Related U.S. Application Data

(63) Continuation-in-part of application No. 09/047,318, filed on Mar. 24, 1998, now abandoned.

(51) Int. Cl.[7] .......................................... G03G 15/045
(52) U.S. Cl. ..................... 399/156; 399/180; 430/42
(58) Field of Search ............................... 399/127, 128, 399/51, 178, 180, 156, 157; 430/42, 54; 347/115; 358/534, 535, 536, 540

(56) References Cited

U.S. PATENT DOCUMENTS

| | | | |
|---|---|---|---|
| 3,967,891 A | * 7/1976 | Rippstein | 399/156 |
| 4,346,982 A | 8/1982 | Nakajima et al. | |
| 4,791,450 A | * 12/1988 | Mosehauer et al. | 355/77 |
| 4,794,421 A | 12/1988 | Stoudt et al. | 430/54 |
| 5,716,744 A | 2/1998 | Yergenson | 430/54 |
| 5,740,502 A | * 4/1998 | Kobayashi et al. | 399/128 |
| 5,895,738 A | 4/1999 | Parker et al. | 430/54 |
| 6,342,953 B1 | * 1/2002 | Wibbels et al. | 358/1.9 |

FOREIGN PATENT DOCUMENTS

| | | | | |
|---|---|---|---|---|
| JP | 62-502996 | 11/1987 | | |
| JP | 2-212863 | 8/1990 | | |
| JP | 08194355 A | * 7/1996 | | G03G/15/01 |
| JP | 8-337007 | 12/1996 | | |
| JP | 9-154020 | 6/1997 | | |
| JP | 10147012 | 6/1998 | | |

OTHER PUBLICATIONS

Electrophotography by R.M. Schaffert; John Wiley & Sons, New York; pp. 80–83.
The Focal Encyclopedia of Photography; McGraw–Hill Book Company; pp. 727–729.

* cited by examiner

*Primary Examiner*—Robert Beatty
(74) *Attorney, Agent, or Firm*—Lane R. Simmons

(57) ABSTRACT

A method for reducing edge effect (white gapping) between objects formed on a photoconductive member of an imaging device includes, during processing of a given color plane, partially exposing the photoconductive member for all image data that specifies a color to be developed on at least one color plane but that specifies no color to be developed on the given color plane. As such, the partial exposing does not enable development of that image data during image processing of the given color plane. By partially exposing objects that do not include a color to be developed on the color plane currently being processed, and while normally exposing adjacent objects that include a color to be developed on the current color plane, the lateral electric field effects between the objects is reduced and, thus, toner development for the given color plane is more edge precise for reduced white gapping between the objects.

16 Claims, 6 Drawing Sheets

COLOR PLANE PARTIAL EXPOSURE FOR REDUCING EDGE EFFECT

CROSS REFERENCE TO RELATED APPLICATIONS

This application is a continuation in part of co-pending U.S. application Ser. No. 09/047,318 filed Mar. 24, 1998 now abandoned.

FIELD OF THE INVENTION

This invention relates in general to color imaging systems and, more particularly, to reducing edge effect (white gapping) between adjacent objects developed in different color planes in jump gap development systems.

BACKGROUND OF THE INVENTION

Electrophotographic (EP) processes for producing a permanent image on media are well known and commonly used. In general, a common process includes: (1) charging a photoreceptor (optical photoconductor or OPC) such as a roller or continuous belt bearing a photoconductive material; (2) exposing the charged photoreceptor to imaging light (laser) that discharges the photoreceptor in select areas to define a latent electrostatic image on the photoreceptor; (3) presenting developer particles (toner) to the photoreceptor surface bearing the image so that the particles are transferred to the surface in the shape of the image; (4) transferring the particles in the shape of the image from the photoreceptor to the media; (5) fusing or fixing the particles in the shape of the image to the media; and (6) cleaning or restoring the photoreceptor for the next printing cycle. Many image forming apparatus, such as laser printers, copy machines, and facsimile machines, utilize this well known electrophotographic printing process.

Laser driven color printers and copiers employ toners that enable light to reflect off the page and to be directed back towards the eye. In general, such devices employ Cyan (C), Magenta (M) and Yellow (Y) toners as the principal component colors, from which other colors are created. Light passing through CMY toners has part of its color filtered out or absorbed by the toner such that the reflected light takes on the color of the toners that it passes through. In laser printers (and some copiers), a black (K) toner is also used which is opaque to light. When a printer receives image data from a host processor, the data is received in the form of either Red, Green and Blue (RGB) values, or CMYK values, or L*a*b* or some other conventional color space values. In any case, the received values are typically converted to CMYK values in order to achieve desired levels of color representation on the final printed document.

In view of the CMYK image values, many color EP devices, such as color laser printers, utilize a single-pass process (i.e., with an in-line imaging system) or a four-pass process (i.e., with a carousel imaging system) to produce a full-color image on a photoconductor, generally referred to herein as a multi color plane image processing cycle. For example, FIG. 1 is a block diagram depicting a conventional four-pass, discharge area development EP system wherein four developer modules 1,2, 3 and 4 are arranged along a moving photoconductor surface/drum 5. Each developer module is allocated to the deposition of one of the CMY and K toners onto the moving photoconductor 5. A charging station (corona) 6 uniformly charges the photoconductor 5 and an exposure station (laser light) 7 selectively discharges the photoconductor in accordance with a color plane's image data. The imaged photoconductor 5 then moves past the respective developer modules, with one developer module being moved into juxtaposition with the photoconductor to allow color toning of the discharged areas. The developed photoconductor then experiences a full rotation, is cleaned 8, charged again 6, and then exposed again in accordance with a next color plane's data and again developed, using the next color developer. The procedure continues until four passes have occurred and a full color image is present on the photoconductor 5. Thereafter, the image is electrostatically transferred via a transfer roller 9 to a sheet media 11.

Alternatively, after development of any given color plane, that color plane's image on the photoconductor surface may be indirectly transferred to the sheet media. Indirect transfer typically comprises transfer of the color plane's image (or one or more planes of the color image) to an intermediate transfer (IT) member and then to the sheet media. Specifically, for example, upon each revolution of the photoconductor, one color plane will be imaged on the photoconductor and then immediately transferred to the IT member. In such indirect transfer, the IT member typically is large enough to hold the entire image plane at one time. Whether direct or indirect electrostatic image transfer occurs, the resultant image is subsequently fused to the sheet media.

In laser printers, the imaging element is generally a laser whose beam is image-wise scanned across the photoconductive belt or drum to produce a desired image. However, the laser optics ("engine") portion of a color electrophotographic printer is both expensive and requires precise alignment to enable accurate super-position of cyan, magenta, yellow and black color planes to create a complete color image. Thus, to reduce the overall cost of such a color printer, only one laser imaging station is generally provided.

Conventional development stations typically are designed either for non-contact ("jump-gap") development or contact development. In non-contact development, the conductive, cylindrical developer sleeve that carries the toner for electrostatic transfer to the photoconductor is separated from the photoconductor surface by a small gap, which is typically in the range of 200–500 microns. A cloud of toner particles is generated in the gap using an AC voltage (Vac) applied to the DC offset $V_{DEV}$. In contact development, the developer sleeve rotates against the photoconductor surface. Toner is typically applied to the surface of the rotating sleeve, which then rotates the toner between the sleeve and the photoconductor, and a bias voltage is applied to the sleeve. In both non-contact and contact development, various transport and metering components may be used to apply toner to or near the sleeve surface (i.e., from a toner hopper or reservoir), including rollers, augers, paddles, blades or mixers, for example.

Jump-gap development is more susceptible to fringe effects and gaps between color fields than is contact development. These fringe (or edge) effects and gaps (also referred to as "white gapping") appear as blurred (or white) image edges and result from imprecise toner development caused by lateral electric field effects between exposed and unexposed areas on the photoconductor surface. In the multiple-development systems of color printers, the fringe effects and gaps of jump-gap development may be magnified, depending on the development and transfer means employed in the process.

More specifically, edge effect or white gapping in a jump-gap development system is caused by the recession of non saturated (i.e., lighter or not fully exposed) colors away from the exposed edge. The recession is caused by the effect of the very negative OPC potential in the non imaged (unexposed or white) area that is edge adjacent to the imaged (exposed) region. At these edges, the development of the toner is inhibited and recedes away from the unexposed white area. This recession from the edge is particularly visible when the edge of the light region butts up against an object of a different color. The recession appears as a white gap between the light region and any object which is supposed to butt tightly against it and that is formed using a color plane other than the color plane of the light region. This white gap around the object can be very visible and results in customer dissatisfaction.

Although contact development may exhibit the benefit of increased image sharpness, it can be mechanically more complicated than jump-gap development in a multi-color process and also has its own associated "ghosting" effects and problems. This complication is due to the fact that: (i) the individual development stations for each color must be engaged and disengaged from the photoconductor surface to affect the contact development of the individual color planes, and (ii) multiple surfaces contact the toner in the development process which can lead to charging and background problems.

Prior solutions aimed at reducing the edge effect in jump-gap development systems have included increasing the strength of the DC field relative to the AC field. Although this results in less effect between adjoining areas, it can cause other serious side affects such as development instability over life. Another proposed solution has been to reduce the edge effect around black characters by using a process black neutral axis. Namely, with normal process black treatment (containing 30–40% of the underlying CMY colors) it is possible to reduce the edge effects at the cost of character acuity for black text. The character acuity decreases due to increased scatter brought on by greater toner pile height and also by mis-registration errors which can cause a character to appear as a double image made of the different color planes. However, this solution only works relative to black characters.

Accordingly, there is a need to reduce white gapping in color jump-gap imaging systems.

SUMMARY OF THE INVENTION

According to principles of the present invention in a preferred embodiment, a method for reducing edge effect (white gapping) between objects formed on a photoconductive member of an imaging device includes, during processing of a given color plane, partially exposing the photoconductive member for image data that specifies a color to be developed on at least one other color plane of the multi color plane image processing cycle but that specifies no color to be developed on the given color plane.

According to further principles in a preferred embodiment, partially exposing occurs relative to a development threshold for the image processing of the given color plane. As such, the partial exposing does not enable development of the image data during image processing of the given color plane. Additionally, in a preferred embodiment, the partial exposing occurs relative to a high frequency halftone screen for minimizing contamination (unwanted development) during the partial exposure. In one embodiment, a half tone screen switching process enables appropriate full halftone exposure for objects embodying the given color plane, and enables the necessary partial exposure (utilizing the high frequency halftone screen) for objects not embodying the given color plane.

By partially exposing objects that do not include a color to be developed on the color plane currently being processed, and by normally exposing adjacent objects that include a color to be developed on the current color plane, the lateral electric field effects between the objects is reduced and, thus, toner development for the given color plane is more edge precise for reduced white gapping between the objects.

Other objectives, advantages, and capabilities of the present invention will become more apparent as the description proceeds.

DETAILED DESCRIPTION OF THE INVENTION

Figure 2:
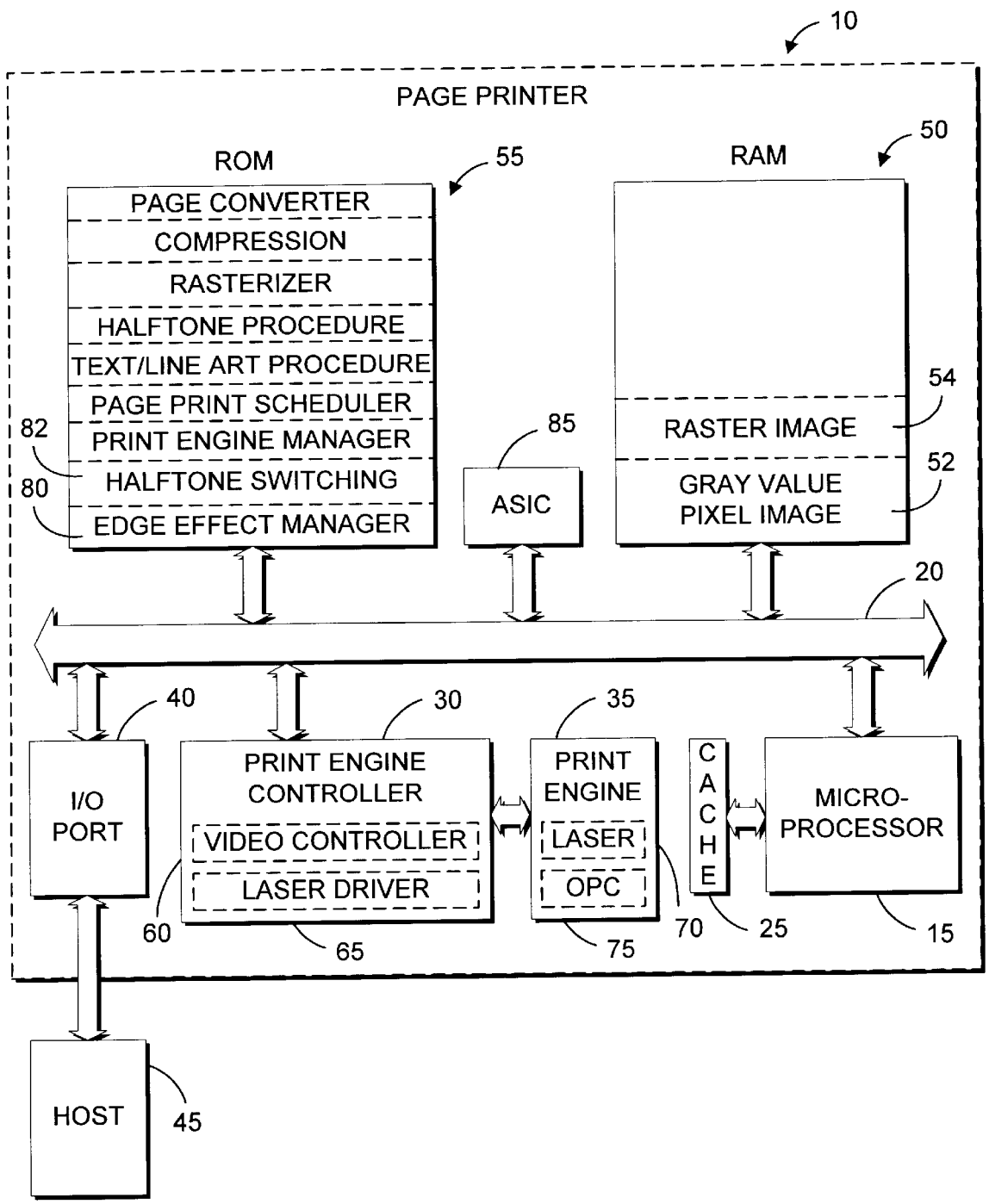
FIG. 2 is a block diagram of a laser printer incorporating an embodiment of the present invention apparatus and method for reducing edge effect.

FIG. 2 is a high level block diagram of a page printer 10 incorporating an embodiment of the present invention apparatus and method for reducing white gapping (edge effect) of an image. Page printer 10 is controlled by a microprocessor 15 which communicates with other elements of the system via bus 20. Microprocessor 15 includes cache memory 25 in a preferred embodiment. A print engine controller 30 and associated print engine 35 connect to bus 20 and provide the print output capability for the page printer. For purposes of this disclosure, print engine 35 is a laser printer that employs a discharge area development electrophotographic drum imaging system as well known in the art. However, as will be obvious to those of ordinary skill in the art, the present invention is similarly applicable to other types of printers and/or imaging devices including, for example, facsimile devices, digital copiers, or the like. Moreover, the invention is similarly applicable with respect to binary or multi-bit pixel source image data. Although a discharge area development (DAD) system is discussed generally in this disclosure, it will be understood that principles of the present invention are similarly applicable to charge area development (CAD) systems. Additionally, like components between figures are labeled with like reference numbers.

An input/output (I/O) port 40 provides communications between the page printer 10 and a host computer 45 and receives page descriptions (or raster data) from the host for processing within the page printer. A dynamic random access memory (RAM) 50 provides a main memory for the page printer for storing and processing a print job data stream received from host 45. A read only memory (ROM) 55 holds firmware (computer executable instructions and/or data) which controls the operation of microprocessor 15 and page printer 10. It is understood, however, that procedures discussed herein for printer 10 may be maintained and utilized as control firmware in any conventional ROM, and/or implemented in an ASIC 85 for high-speed hardware functionality, and/or implemented in connection with RAM 50 or cache 25 as conventional in the art. The ROM 55 and the RAM 50 are examples of conventional computer readable media, as are disk media (not shown) such as a compact disk (CD) or conventional "floppy" diskette.

Code procedures stored in ROM 55 include, for example, a page converter, rasterizer, compression code, halftone procedure, text/line art procedure, page print scheduler, print engine manager, and/or other image processing procedures (not shown) for generating an image from a print job data stream. As conventional in the art, the page converter firmware converts a page description received from the host to a display command list, with each display command defining an object to be printed on the page. The rasterizer firmware converts each display command to an appropriate bit map (rasterized strip or band) and distributes the bit map into memory 50. The compression firmware compresses the rasterized strips in the event insufficient memory exists in memory 50 for holding the rasterized strips. The object of the halftone procedure is to convert any continuous tone image into a halftoned raster image. The text/line art procedure converts any text and line art images into a raster image. These may be conventional procedures known in the art.

ROM 55 further includes edge effect manager 80 and halftone switching procedure 82 according to principles of the present invention in a preferred embodiment. Namely, edge effect manager 80 and halftone switching procedure 82 include routines, tables, data structures and/or data (jointly referred to herein generally as firmware or executable instructions) as necessary for reducing white gapping (edge effect) as will be discussed more fully herein. Although in FIG. 2 edge effect manager 80 and halftone switching procedure 82 are depicted in connection with ROM 55, it will be obvious and understood by those of ordinary skill in the art that the same may be implemented in ASIC 85 instead, as will be discussed more fully herein.

RAM 50 is shown as storing gray value pixel image 52 which is to be altered into a source raster image 54 suitable for rendering by laser print engine 35. Gray value pixel image 52 is received from a host 45 via I/O port 40. Raster image 54 may be buffered in RAM or fed directly from ASIC 85 to print engine 35. Gray value pixel image 52 is generally of the known type, for example, wherein each pixel is represented by a multi-bit gray value. If gray value pixel image 52 is a color image, it will comprise (generally) four color planes with three of the color planes representing cyan (C), magenta (M) and yellow (Y) color values. Moreover, each color value in each plane may be represented by a predetermined number of bits—for example, by 8 bits. A fourth plane, representing black (K), may be comprised of single or multiple bit values at each pixel location where a black or gray scale image value is to appear on the ultimate rendered output. Thus there may be a total of 25 to 32 bits per pixel in gray value pixel image 52 if color is embodied. On the other hand, if gray value pixel image 52 is a non-color image, each pixel may, for example, be represented simply by 8 bits to depict 256 levels of gray as well known in the art. Other bit depths and color planes, such as in hi-fi printing, are equally applicable in the present invention, as will be obvious to those of ordinary skill in the art.

In general, the operation of page printer 10 commences when it receives a page description from host computer 45 via I/O port 40 in the form of a print job data stream. The page description is placed in RAM 50 and/or cache 25. Microprocessor 30 accesses the page description, line by line, and builds a display command list using the page converter firmware in ROM 55. As the display command list is being produced, the display commands are sorted by location on the page and allocated to page strips in memory 50. When all page strips have been evaluated, rasterized, compressed, etc. for processing by print engine 35, the page is closed and the rasterized strips are passed to print engine 35 by print engine controller 30, thereby enabling the generation of an image (i.e., text/graphics etc). The page print scheduler controls the sequencing and transferring of page strips to print engine controller 30. The print engine manager controls the operation of print engine controller 30 and, in turn, print engine 35.

Processor 15 feeds to a video controller 60 a raster image 54 of binary values which represent the image to be imprinted on a page. The video controller, in response, feeds a series of binary data signals to a laser driver 65 which, in turn, modulates laser 70 in accordance with the binary data signals. As conventional in the art, the modulated beam from laser 70 is directed at a rotating, faceted mirror that scans the beam across an imaging lens which directs the scanned beam to a mirror which redirects the scanned beam onto a moving OPC 75. The laser beam is scanned across the OPC to cause selective discharge thereof in accordance with the modulation of the beam. At the termination of each scan action, the laser beam is incident on a photodetector which outputs a beam detect signal that is used to synchronize the actions of video controller 60 and processor 15.

More specifically, according to the present invention in a preferred embodiment, laser 70 is modulated to control depth of discharge of OPC 75 such that only a partial exposure (or under exposure in the depicted DAD system) of OPC 75 occurs relative to specific image data having at least some color value but having no color value for the color plane currently being processed. Consequently, edge effect (or white gapping) between objects (images) is reduced on OPC 75 and subsequently, on a media (sheet) that is passed by OPC 75 for toner image transfer.

It should be noted here that, because a DAD system 10 is the example of discussion, the term "under" exposure will be used herein interchangeably with the term "partial" exposure. Additionally, it should be noted that when OPC 75 is partially exposed according to the present invention, the electrostatic charge of the OPC is modified to a charged state (or discharged state) that is different from its original charged state but that does not generally enable development. Moreover, for purposes of this discussion, "full" or "normal" exposure means a modification of the electrostatic charge of the OPC that is sufficient to enable development of the image, regardless of whether or not a halftone pattern is used.

Figure 3:
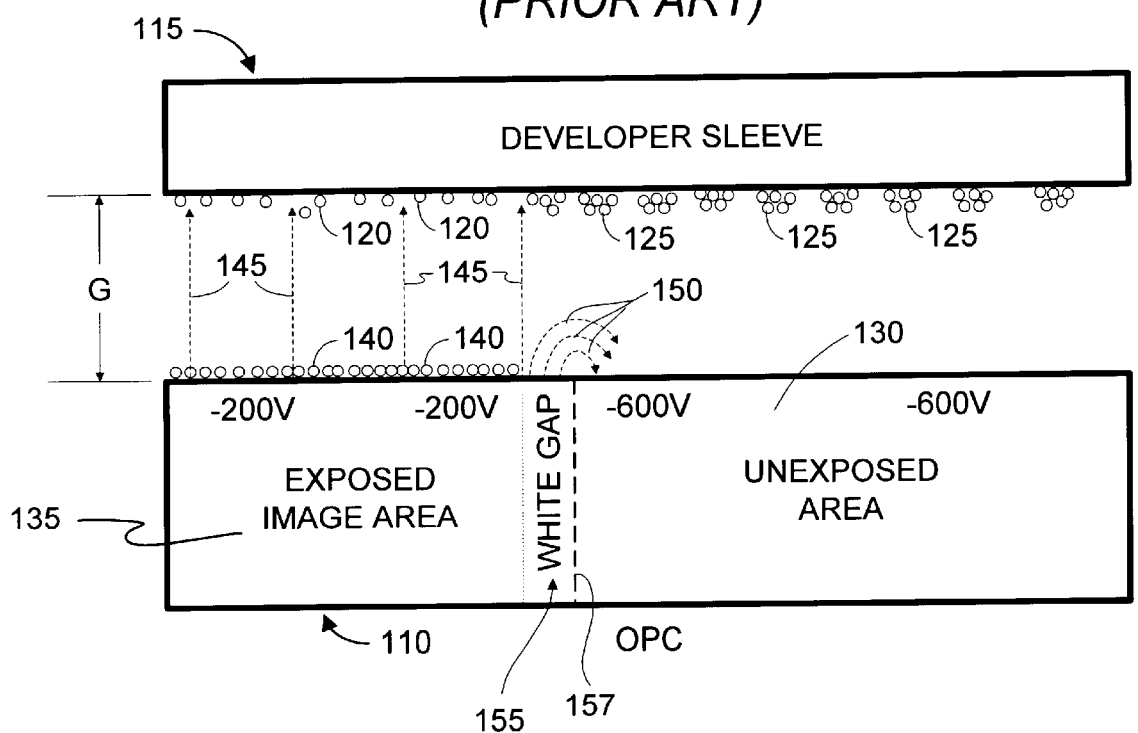
FIG. 3 is a block diagram depicting an EP jump-gap development system employing an image development method as conventional in the art.

Referring now to FIG. 3, a block diagram depicts a DAD EP jump-gap development system employing an image development method as conventional in the art. FIG. 3 is shown to more clearly understand the workings and advantages of the present invention discussed subsequently in an embodiment in reference to FIG. 4. As per FIG. 3, optical photoconductor (OPC) 110 is disposed adjacent to developer sleeve 115 with a jump-gap "G" formed there between, typically in the range of 200–500 microns.

As conventional in the art, developer sleeve 115 is charged to attract toner particles 120, 125 for subsequent electrostatic transfer to OPC 110. In this example, OPC 110 is initially charged to −600 volts (V) prior to any development or light exposure as depicted by unexposed area 130. OPC 110 is also shown as having an exposed image area 135 (previously exposed by a laser light beam for image development). Thus, image area 135 is now shown as discharged to −200V for imaging purposes. As such, toner particles 140 are deposited on OPC 110, at image area 135, having been previously transferred from developer sleeve 115 from the area near toner particles 120. Electrostatic field lines 145 depict the electrostatic field attraction between OPC 110 and developer sleeve 115 whereby toner particles 140 were transferred to image area 135 of OPC 110.

Importantly, electrostatic field lines 150 depict the field effect between discharged (exposed) area 135 and unexposed area 130 of OPC 110. Such field lines 150 create white gap area 155 between exposed image area 135 and unexposed area 130. Field lines 150 are due to the high voltage difference between exposed image area 135 (−200V) and unexposed area 130 (−600V). Field lines 150 effectively disallow the complete transfer (development) of toner particles 120 from developer sleeve 115 to exposed image area 135 of OPC 110 near image edge 157, thus creating white gap 155. This white gap is especially noticeable when different color planes are developed adjacent to each other during a multi color plane image processing cycle. For example, if a magenta color plane is initially developed onto exposed image area 135, and then a cyan color plane is subsequently developed onto area 130 (during a subsequent color plane processing cycle of the multi color plane image processing cycle), then white gap 155 is visibly and annoyingly distinct between the two color developed areas.

Figure 4:
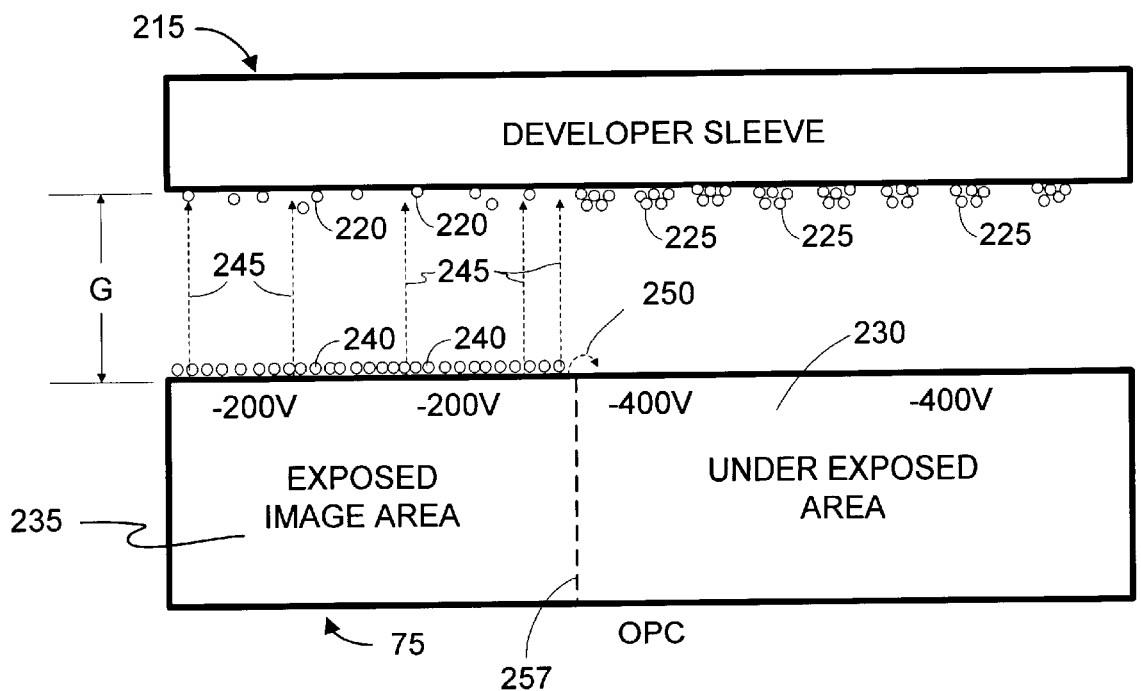
FIG. 4 is a block diagram depicting an EP jump-gap development system employing an image development method according to an embodiment of the present invention.

Referring now to FIG. 4, a block diagram depicts a DAD EP jump-gap development system employing an image development method and configuration according to one embodiment of the present invention. OPC 75 is disposed adjacent to developer sleeve 215 with jump-gap distance "G". Fully exposed image area 235 has been exposed to establish a −200V charge (relative to an initial unexposed charge of −600V), thereby creating electrostatic field lines 245 for attracting toner particles 240 from (originally) near toner particles 220 of developer sleeve 215 for developing the image (i.e., image generation).

Importantly, the non-imaged area 230 (at least for the current color plane) is partially exposed (under exposed for this DAD system) such that OPC 75 retains a −400V charge rather than the conventional unexposed −600V charge. As such, field effect lines 250 that are established between the exposed area 235 and partially-exposed area 230 are significantly reduced (relative to those 150 of FIG. 3) and, thus, the white gap effect is significantly reduced or eliminated. Although the exposed image area 235 is shown as being discharged to −200V, and the partially-exposed area 230 is shown as being discharged to −400V, it is understood that these numbers are merely exemplary of usable voltages. What is important, however, is that the partially-exposed area 230 be partially exposed to a level that does not enable any generally visible image development by toner particles 225 during processing of the current color plane. Thus, the development threshold voltage value for the current color plane must not be exceeded for partial exposed area 230.

Notably, the partially exposed area 235 is not leveraged (or used) with merely additional, supplemental or additive exposure to subsequently develop an image at any time during the multi color plane image processing cycle. Rather, for any image that is to be subsequently developed at that same area 230 during processing of a different color plane during the multi color plane image processing cycle, the photoconductor is first completely recharged and then that area is subsequently fully exposed for normal image generation (i.e., similar to area 235). Thus, the partially exposed state does not cause and is not leveraged to cause image development at any time during the multi color plane image processing cycle.

It should also be noted that fully exposed image area 235 and under exposed area 230 are represented here as generalized areas on OPC 75. However, these areas are only representative in that exposed image area 235 represents image data (i.e., an object or pixel) that includes a color defined by the color plane currently being processed. For example, if the current color plane cycle is magenta (M), then exposed image area 235 represents image data that includes a magenta value in its CMYK makeup of data values. On the other hand, under exposed area 230 represents image data that does not include a color defined by the color plane currently being processed (i.e., magenta) in its CMYK data values makeup but that includes at least some other color value CY or K. However, if no image is to be subsequently developed on some other color plane adjacent to exposed area 235 (i.e., at under exposed area 230), then area 230 needn't be under-exposed during processing of the M (or current) color plane for imaging of exposed area 235.

To further clarify, Table 1 depicts an exemplary CMYK multi color plane imaging processing cycle utilizing edge effect compensation (reduction) of the present invention for two pixels of image data. The first pixel data "A" is defined by CMYK color values 0,128,0,0, and the second pixel data "B" is defined by CMYK color values 128,128,0,0.

TABLE 1

| Color Plane | Pixel "A"<br>CMYK = 0,128,0,0 | Pixel "B"<br>CMYK = 128,128,0,0 |
| --- | --- | --- |
| Y | under expose | under expose |
| M | 128 | 128 |
| C | under expose | 128 |
| K | under expose | under expose |

Now in further reference to Table 1, during the yellow (Y) color plane processing, since pixel "A" is defined by at least one color plane value (in this case a 128 M value), and since pixel "A" is defined with a 0 (no) yellow value, then pixel "A" is under exposed during the Y color plane imaging process (see FIG. 4, under exposed area 230). Continuing with the yellow color plane processing, since pixel "B" is defined by at least one color plane value (in this case 128 CM values), and since pixel "B" is defined with a 0 (no) yellow value, then pixel "B" is also under exposed during the Y color plane imaging process. Note that no edge effect compensation is seen in this Y color plane processing relative to the two exemplary pixels "A" and "B", even though both pixels were under exposed per the present invention.

Now with respect to the magenta (M) color plane processing, again, since pixel "A" is defined by at least one color plane value, and that value is a 128 magenta value, then pixel "A" is exposed during the M color plane imaging process per its 128 color definition (see also FIG. 4, exposed area 235). Similarly, since pixel "B" is defined by at least one color plane value and includes a 128 magenta value, then pixel "B" is also exposed during the M color plane imaging process per its 128 color definition. Again note that no edge effect compensation of the present invention is seen in this M color plane processing relative to the two exemplary pixels "A" and "B".

Continuing now with the cyan (C) color plane processing, since pixel "A" is defined by at least one color plane value and since pixel "A" is defined with a 0 (no) cyan value, then pixel "A" is under exposed during the C color plane imaging process (see FIG. 4, under exposed area 230). However, in continuing with the cyan color plane processing, since pixel "B" is defined by at least one color plane value which includes a 128 cyan value, then pixel "B" is exposed during the C color plane imaging process per its 128 cyan color definition (see also FIG. 4, exposed area 235). Note that this configuration as between pixels "A" and "B" clearly depicts the edge effect compensation of the present invention. Specifically, since pixel "A" was under exposed, and pixel "B" was exposed normally per its color value, the electrostatic field effect between the two pixels is reduced thereby effectively reducing the white gap between the two pixels.

Finally, continuing in reference to Table 1, during the black (K) color plane processing, since pixel "A" is defined by at least one color plane value, and since pixel "A" is defined with a 0 (no) black value, then pixel "A" is under exposed during the K color plane imaging process. Similarly, since pixel "B" is defined by at least one color plane value, and since pixel "B" is defined with a 0 (no) black value, then pixel "B" is also under exposed during the K color plane imaging process. Note, again, that in this instance no real edge effect compensation is seen although both pixels were under exposed.

Figure 1:
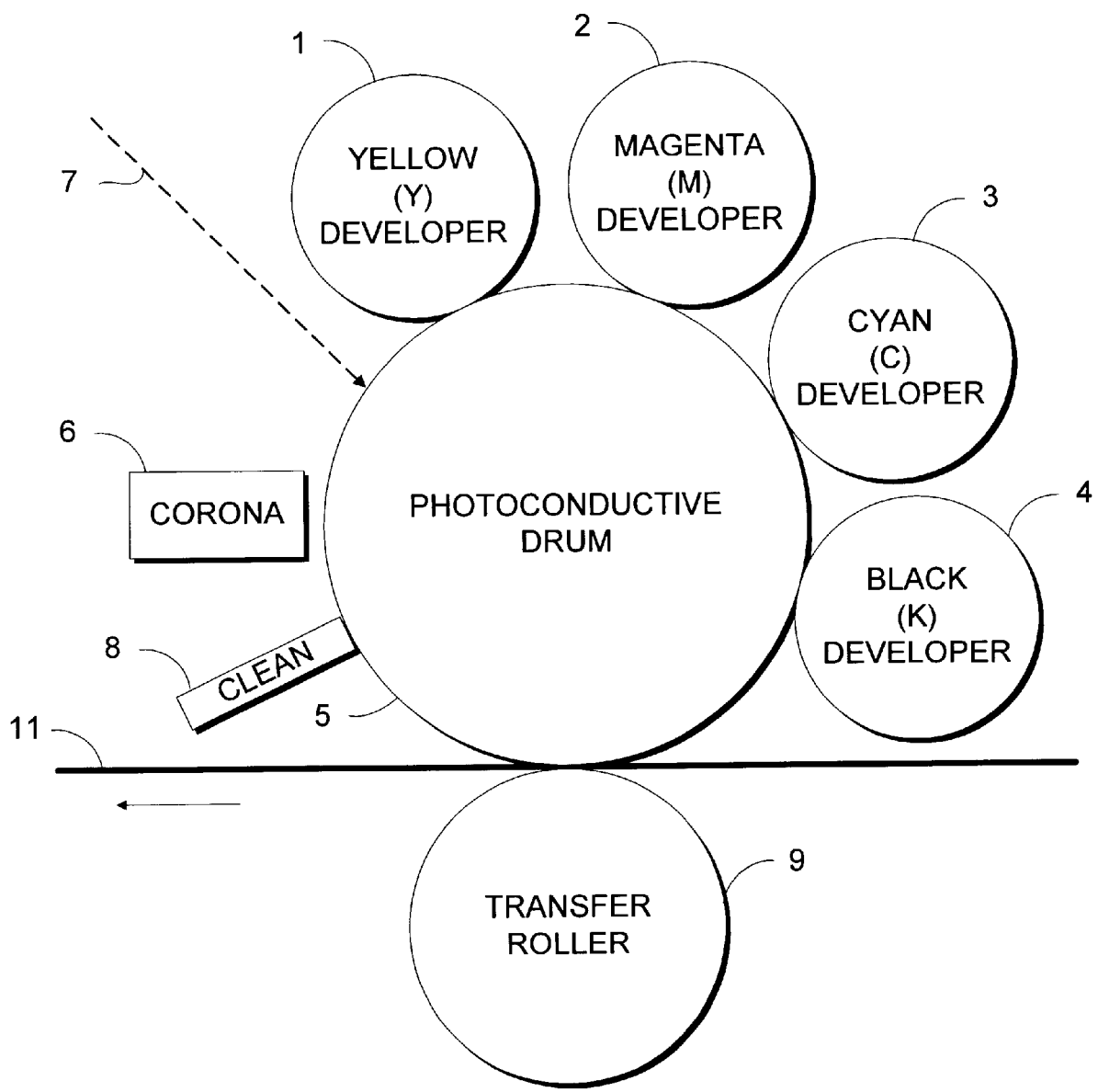
FIG. 1 is a block diagram depicting a conventional EP color imaging system having four developer modules arranged along a photoconductor drum.
Figure 5:
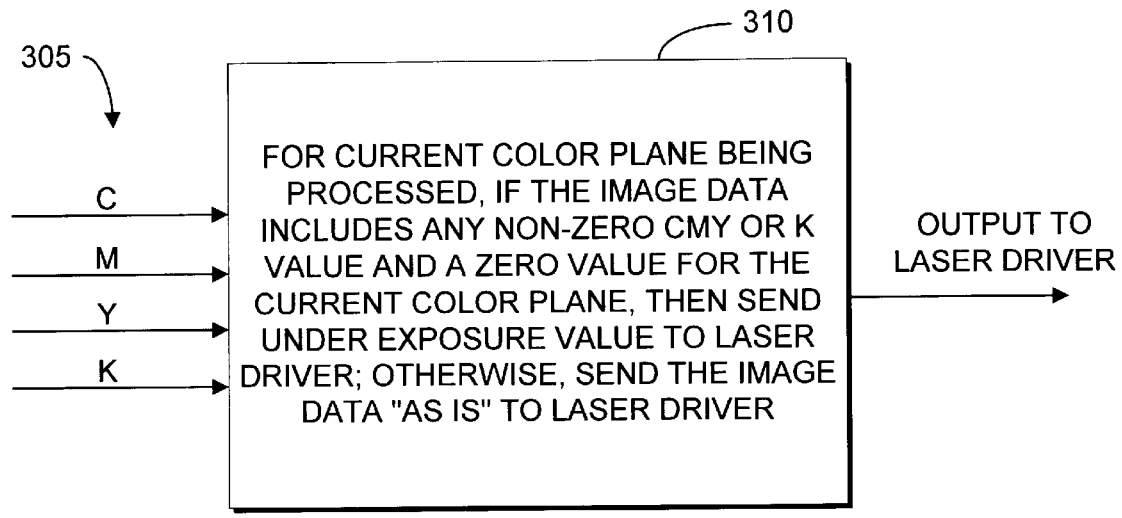
FIG. 5 is a high level schematic block diagram depicting a generalized apparatus and method according to an embodiment of the present invention.

Referring now to FIG. 5, a high level schematic block diagram depicts each of the four color plane CMYK data lines 305 in printer 10, and a logic block 310 for acting upon each plane according to one embodiment of the present invention and for producing the proper exposure level for OPC 75. Logic block 310 is, preferably, implemented in hardware such as in ASIC 85 (FIG. 1). Logic block 310 determines whether for the current color plane the image data at hand includes some non-zero CMYK value (i.e., meaning at least some color value is associated with the data). In addition, if the image data includes a zero value for the current color plane being processed (i.e., meaning the data does not contain a value for imaging within the current color plane), then an under exposure value/signal is sent to the laser driver for the image data. Otherwise, send the image data to the laser driver "as is". For example, if the magenta (M) plane is considered as the current color plane being processed, and the image data contains a magenta value, then logic block 310 processes the data as dictated by the magenta value itself. Namely, laser 70 is controlled to expose OPC 75 such that the magenta data image will subsequently be developed thereon. This means exposing OPC 75 beyond a current development threshold level for print engine 35 (for example, altering the surface potential to be about −200V relative to an initial −600V charge). On the other hand, for any image data that does not contain a magenta value, but that contains some other color plane value, then during processing of the current magenta color plane that data is processed such that OPC 75 is under-exposed. The under-exposure occurs such that no image is developed for that data because the surface potential of OPC 75 is not exposed beyond the development threshold level but rather to some potential less than the development threshold level (for example, to about −400V relative to the initial −600V charge).

Figure 6:
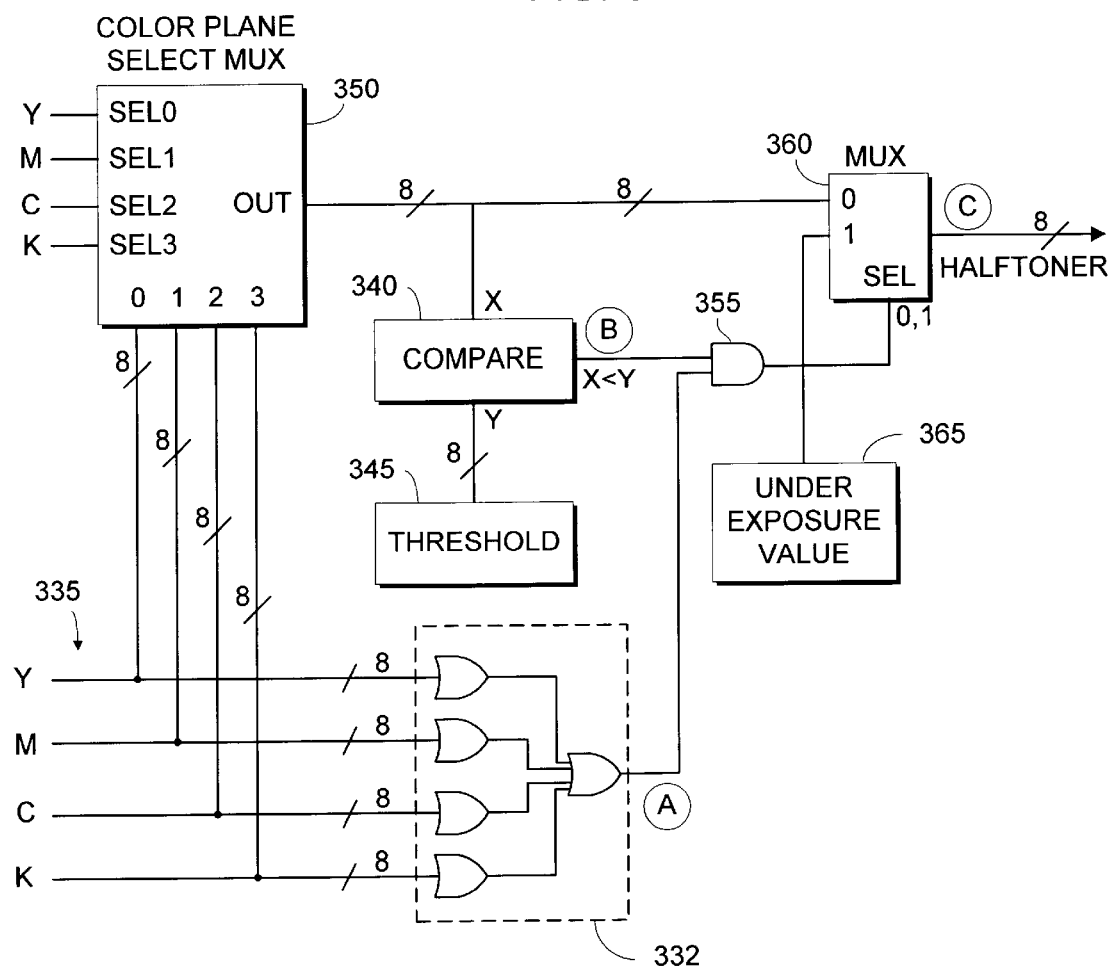
FIG. 6 is a schematic diagram depicting an embodiment of exemplary circuitry for the logic block of FIG. 5.

FIG. 6 is a schematic diagram depicting preferred circuitry for logic block 310 of FIG. 5. This circuit implements edge effect manager 80 and halftone switching procedure 82 in ASIC 85 rather than ROM 55 (see FIG. 1). Descriptively, logic output "A" (from OR gates 332) indicates whether there is some color value defined by the current pixel image data received on YMCK lines 335. Compare logic 340 compares a threshold value (provided by threshold logic block 345) with the 8 bit color plane data received from the current pixel image data for the current color plane. The 8 bit color plane data is received through color plane select multiplexor (mux) 350. If, as in a preferred embodiment, the threshold value from block 345 is non-zero, then any time the current color plane data is zero, a logical high is output at "B". If, also, a logical high is output at "A" (meaning some color is defined for at least one of the color planes), then AND gate 355 provides a logical high to the select line of output mux 360. As such, an under exposure value (or an under exposure "select" value or halftone screen "select" value) is passed from logic block 365 through mux 360 to output "C". The under exposure value is, preferably, a value identifying a high frequency halftone screen and pulse width modulation to be selected for modulation of laser 70 onto OPC 75 (FIG. 1) such that the development threshold is not reached. Consequently, under exposure occurs per the present invention.

On the other hand, if the current color plane data is not zero (i.e., color is defined for the current color plane) at compare block 340, then a low logic value is output at "B" and, consequently, at the select line of output mux 360. Thus, the 8 bit color definition data received through color plane select logic 350 is passed directly through output mux 360 to output "C". Consequently, a default, stable (clustered) halftone screen is used and laser 70 is modulated per the color definition data for normal exposure.

Comparatively, if none of the color planes 335 include any color data, then the output at "A" is a logical low, which ultimately enables mux 360 to pass that data (for the selected color plane 350) on to output "C". No modulation of laser 70 will occur because such is "white" data.

An alternate embodiment for enabling under-exposure according to the present invention includes utilizing a color table lookup implementation. This is effective if image data must be converted from Red, Green, Blue (RGB) format to CMYK. Edge effect manager 80 (FIG. 1) in ROM 55 represents this embodiment. If the image data is received in RGB format, then the RGB data is converted to CMYK data using conventional color table lookup processing, but includes having the color table created with references to specific high frequency halftone screen values where appropriate for under exposure per the present invention.

To illustrate, Table 2 represents a simplified RGB to CMYK color space lookup table for two pixels "A" and "B". Table 2 shows a conversion from RGB to conventional CMYK, and also to a "modified" CMYK value per an embodiment of the present invention for enabling partial exposure and reduced edge effect.

TABLE 2

| Pixel | RGB | CMYK (conventional) | CMYK (invention) |
|---|---|---|---|
| "A" | 128,0,128 | 0,128,0,0 | 1,128,1,1 |
| "B" | 0,0,128 | 128,128,0,0 | 128,128,1,1 |

Per Table 2, an RGB value of 0,0,0 depicts black, and an RGB value of 255,255,255 (CMYK 0,0,0,0) depicts white. If, for example, pixel "A" has an RGB value of 128,0,128, then that value would typically (conventionally, using a simple RGB=1-CMYK conversion process) be converted to an appropriate CMYK value of 0,128,0,0. However, under the present invention, the zero value color planes (in this example CYK) are not kept as zero but are substituted in the lookup table with a value representative of a high frequency halftone screen and pulse width modulation that is needed for under exposure of OPC 75. Namely, for example, a CMYK value of 1,128,1,1 is placed in the look up table responsive to the RGB conversion with the "one" (1) values being indicative of a high frequency halftone screen to be selected. Thus, as each color plane is processed for pixel "A", a conventional, stable, clustered halftone screen will be selected for processing of the 128 magenta (M) value, but a high frequency halftone screen will be selected for the other color planes CYK for under exposure purposes.

Similarly, pixel "B" would typically convert from 0,0,0 RGB to 128, 128, 0, 0 CMYK in a conventional color conversion look up table. However, under the present invention, pixel "B" converts to 128, 128, 1, 1, where the "one" (1) values are indicative of a high frequency halftone screen to be selected for under exposure purposes, thereby reducing white gapping edge effect.

Figure 7:
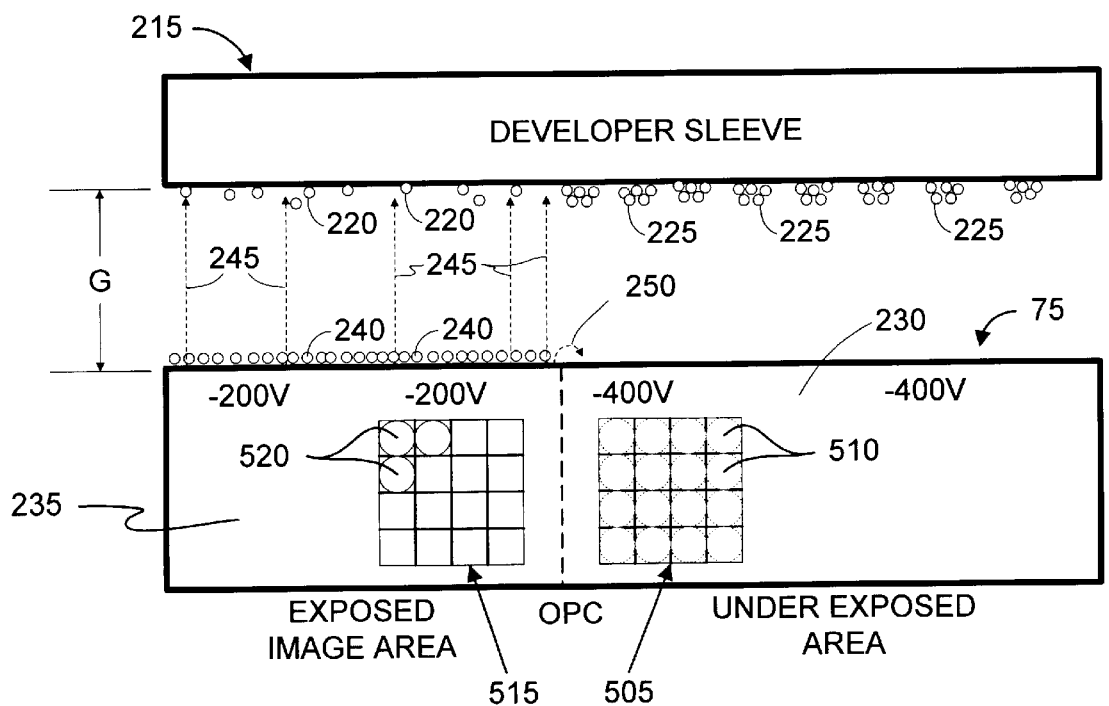
FIG. 7 is a block diagram of the EP jump-gap development system of FIG. 4 further depicting one embodiment of halftone frequency screens.

Referring now to FIG. 7, the EP jump-gap development system of FIG. 4 is shown further depicting representations of certain embodiments of halftone screens used in connection with processing image data relative to OPC 75. Specifically, under one embodiment of the present invention, a high frequency halftone screen 505 is used relative to image data that is under-exposed as previously described herein. Preferably, high frequency halftone screen 505 is a screen that causes each pixel (cell) to be partially exposed such that the development threshold over substantially the entire area 230 is not reached (or at least the entire area as defined by the data being processed). Additionally, screen 505 describes the pulse width modulation necessary for under exposure below the development threshold. This enables the best pattern distribution and modulation for laser 70 to under-expose OPC 75 for reduced edge effect relative to exposed area 235. Pixels 510 of screen 505 are depicted in dotted lines representative of partial exposure.

Exposed area 235 uses a conventional halftone screen(s) 515 for developing the data from the color plane currently being processed. Specifically, halftone screen 515 is typically a clustered screen for enabling stable development. Pixels 520 are depicted in solid lines to represent a full, stable halftone exposure (where "full" exposure is defined by the image data value itself).

As image data is processed by printer 10 (FIG. 1), halftone switching procedure 82 enables image data associated with the current color plane to be passed through a conventional, clustered, stable halftone screen 510 for normal exposure (i.e., exposed image area 235) as dictated by the data. On the other hand, halftone switching procedure 82 enables image data that does not have a color value for the current color plane but that is defined by a color value for at least one other color plane to be passed through high frequency halftone screen 505 for under-exposure (i.e., under exposed area 230) and such that no development occurs there.

Figure 8:
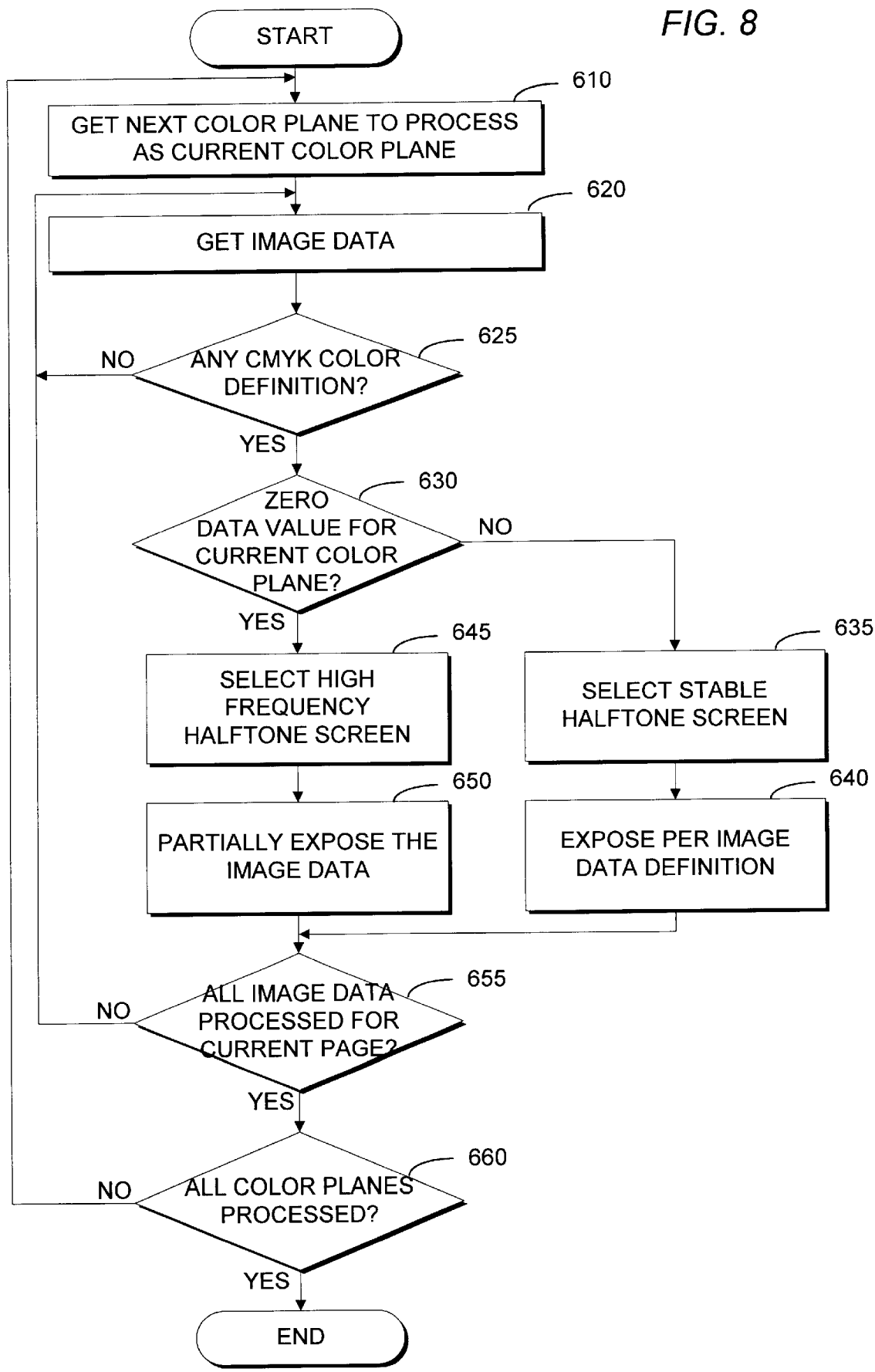
FIG. 8 is a flow chart depicting an embodiment of a preferred method of the present invention for reducing edge effect.

In reference now to FIG. 8, a flow chart depicts one embodiment of a preferred method of the present invention for reducing edge effect in a multi color plane image processing cycle. First, a color plane is selected 610 (such as CMY or K) and identified as the current color plane for image processing in the multi color plane image processing cycle. Upon receipt of the image (pixel) data 620, if there is no color value 625 for that data, then no exposure or under exposure is necessary and so the laser 70 (FIG. 1) continues its scan and the next image data 620 is received for processing. However, if the image data holds a value for at least one of the CMYK color planes 625 (i.e., there is a non-zero value in at least one of the CMYK data fields), then further analysis will occur for that image data.

Next, if the image data is defined for development within the current color plane 630 (i.e., if there is a non-zero value in the current color plane data field), then the proper, conventional, stable halftone screen is selected 635 and exposure occurs 640 for that image data relative to the selected halftone screen.

On the other hand, if the image data is not defined for development within the current color plane 630 (i.e., if there is a zero value in the current color plane data field), then a high frequency halftone screen is selected 645 (including laser pulse width modulation) so that partial exposure occurs 650 for that image data relative to the selected high frequency halftone screen.

If there is more image data to process for the current page 655, then the next data is received 620, evaluated and processed in a similar manner as appropriate. Once a page is completely processed 655 (for the current color plane), if there are more color planes to process 660, then the next color plane is selected 610 and the steps and analysis are repeated as appropriate.

Finally, what has been described above are the preferred embodiments of an apparatus an method for reducing edge effect between objects formed with an EP color imaging device. While the present invention has been described by reference to specific embodiments, it will be apparent that other alternative embodiments and methods of implementation or modification may be employed without departing from the true spirit and scope of the invention.

What is claimed is:

1. A method of image processing on a color imaging device having a photoconductive member, the method comprising:

during image processing of a first color plane in a multi color plane image processing cycle, modifying a first charge of the photoconductive member to a generally second charged state for all image data that specifies no color to be developed on the first color plane but that specifies a color to be developed on at least a second color plane in the multi color plane image processing cycle, wherein the generally second charged state does not enable and is not leveraged to enable image development at any time during the multi color plane image processing cycle.

2. The method of claim 1 wherein the second charged state occurs relative to a development threshold for the image processing of the first color plane.

3. The method of claim 1 wherein the second charged state occurs relative to a halftone screen having a pixel exposure frequency that is less than or equal to a maximum frequency halftone screen and greater than a stable frequency halftone screen for image development.

4. The method of claim 1 wherein the multi color plane image processing cycle includes a discharge area development (DAD) technique for image development.

5. The method of claim 1 wherein the multi color plane image processing cycle includes a charge area development (CAD) technique for image development.

6. The method of claim 1 wherein modifying a first charge of the photoconductive member to a generally second charged state includes partially exposing the photoconductive member to a partially exposed state.

7. A method for reducing edge effect between images formed on a photoconductive member of an imaging device for development, the method comprising:

(a) modifying a charge of the photoconductive member to a generally first charged state to generate a first image on the photoconductive member during processing of a first color plane in a multi color plane image processing cycle, the first color plane used in forming a color associated with the first image; and, (b) modifying the charge of the photoconductive member to a generally second charged state for all data defining a second image adjacent to the first image during processing of the first color plane, wherein the first color plane is not used in forming a color associated with the second image, and wherein the second charged state does not enable and is not leveraged to enable image development at any time during the multi color plane image processing cycle.

8. The method of claim 7 further including modifying the charge of the photoconductive member to the first charged state for the second image during processing of a second color plane in the multi color plane image processing cycle, the second color plane used in forming a color associated with the second image.

9. The method of claim 7 wherein the first charged state enables development of the first image.

10. The method of claim 7 wherein modifying a charge of the photoconductive member to a generally first charged state for the first image includes altering an electrostatic charge potential of a surface area of the photoconductive member such that development of the first image is enabled during processing of the first color plane, and wherein modifying a charge of the photoconductive member to a generally second charged state for the second image includes altering an electrostatic charge potential of a surface area of the photoconductive member.

11. The method of claim 7 wherein modifying a charge of the photoconductive member to the generally first and second charged states occurs relative to a development threshold for the first color plane.

12. The method of claim 7 wherein modifying a charge of the photoconductive member to a generally second charged state includes employing a halftone screen having a pixel exposure frequency that is less than or equal to a maximum frequency halftone screen and greater than a stable frequency halftone screen.

13. The method of claim 7 wherein the multi color plane image processing cycle includes a discharge area development (DAD) technique for image development.

14. The method of claim 7 wherein the multi color plane image processing cycle includes a charge area development (CAD) technique for image development.

15. The method of claim 7 wherein modifying a charge of the photoconductive member to a generally second charged state includes partially exposing the photoconductive member to a partially exposed state.

16. A method of image processing, comprising:

during image processing of a first color plane in a multi color plane image processing cycle, partially exposing a photoconductive member to a partially exposed state for all image data that does not describe any color to be developed on the first color plane but that specifies a color to be developed on at least a second color plane in the cycle, and wherein the partially exposed state does not enable and is not leveraged to enable image development at any time during the cycle.

* * * * *